OPTICALLY SMOOTH REFLECTOR CONSTRUCTION

Filed Oct. 1, 1963 2 Sheets-Sheet 1

Inventor:
Carlyle S. Herrick,
by Leo I. MaLossi
His Attorney.

Inventor:
Carlyle S. Herrick,
by Leo I. MaLossi
His Attorney.

United States Patent Office 3,410,636

Patented Nov. 12, 1968

3,410,636

OPTICALLY SMOOTH REFLECTOR CONSTRUCTION

Carlyle S. Herrick, Alplaus, N.Y., assignor to General Electric Company, a corporation of New York Filed Oct. 1, 1963, Ser. No. 312,947
18 Claims. (Cl. 350—288)

ABSTRACT OF THE DISCLOSURE

An optically smooth reflecting surface is obtained by polymerizing a solventless polymerizable material over the minute depressions and imperfections of a substrate material. This varnish material fills such imperfections to a common level, providing an optically smooth surface for depositing a reflective material.

This invention relates to the preparation of a high quality specular surface and more particularly to means and processes for conditioning a substrate surface to greatly reduce the irregularities and imperfections in the surface both in number and in condition of variance from a common level whereby, when a reflective layer is deposited upon this conditioned surface, a high degree of specularity and a low degree of image distortion are provided.

This invention is generally applicable to the construction of reflectors and the nature of the substrate is only important insofar as proper bonding of the materials applied thereto can be assured. However, the high performance and unique capacities of this invention are best illustrated in connection with the manufacture of reflective thermoplastic recording (TPR) tape, which tape embodies a thin flexible mirror. Before the advent of the development described herein the best available quality of reflective TPR tape constructed using a base surfaced to the highest degree of smoothness that can be provided commercially has provided satisfactory performance for the conduct of experiments for the development of equipment for optical read-out of TPR tape, but has not been satisfactory for use in commercial practice because the mirror portion of even the best available reflective tape remains replete with minute surface irregularities and imperfections, generally holes about one micron or less across, which result in objectionable scattering (non-specular reflection) of beams of light reflected from the tape during optical read-out. This troublesome phenomenon is generally referred to as "optical noise."

It is, therefore, an object of this invention to provide a reflector construction wherein a surface-smoothing coating is applied to the substrate prior to deposition of the reflective film itself whereby light scattering centers in the completed reflector are greatly reduced.

Another object of this invention is the provision of treatment for the surface of a base material prior to receiving the deposition of a thin conforming reflective coating thereon whereby the completed miror is substantially devoid of light scattering centers.

A further object of this invention is the development of a reflective thermoplastic recording tape construction wherein the available quality of the optical read-out therefrom is compatible with the quality required for commercial practice because of the reduction in the number of light scattering imperfections in the specular surface whereby the image therefrom is free of bright spots of an intensity above the threshold of distraction to the viewer.

Still a further object is the provision of a reflective thermoplastic recording tape construction as recited above of greatly reduced thickness thereby greatly increasing the amount of data that can be introduced and stored per unit volume of tape.

The above and other objects are secured by this invention wherein a mirror of high optical quality and long life is produced by selecting a strong, heat resistant base material with a surface as smooth as may be produced commercially; depositing over this surface a thin film of low viscosity, solventless polymerizable material of low volatility whereby the minute depressions and imperfections in the surface of the base material become filled and the surface is brought to a common level; heating or otherwise polymerizing this film into a solvent resistant, heat resistant layer compatible with the coating of reflective material to be superimposed thereon, and depositing a reflective layer on the surface of the base material so treated by any of the several well-known mirror-making procedures.

In the manufacture of reflective thermoplastic recording tape, the procedure outlined above is conducted on a suitably thin flexible base material such as metal tape or plastic strip and after the deposition of a thin film mirror coating thereover, a final thin layer of thermoplastic polymer is applied thereto from solution in a suitable solvent.

Since various terms must be employed in the description of this invention to follow, a glossary of these terms will be useful for the proper interpretation thereof:

"Solventless varnish"—a low viscosity, low volatility solventless material that can be polymerized in situ to a hard, smooth surface and includes materials occurring as pre-polymers and catalyzed monomers of high enough molecular weight to have a viscosity of at least about 10 centipoise in the temperature range from about 60 to 180° C.

"Pre-polymer"—a catalyzed composition in which polymerization has begun and can be completed on demand (this is analogous to a B-staged phenolic resin); "polymerization" as used herein includes condensation polymerization.

Other objects and many of the advantages of this invention will be readily appreciated as the same becomes better understood by reference to the following detailed description when considered in connection with the accompanying drawings in which like reference numerals designate like parts throughout the figures thereof and wherein.

Figure 5:
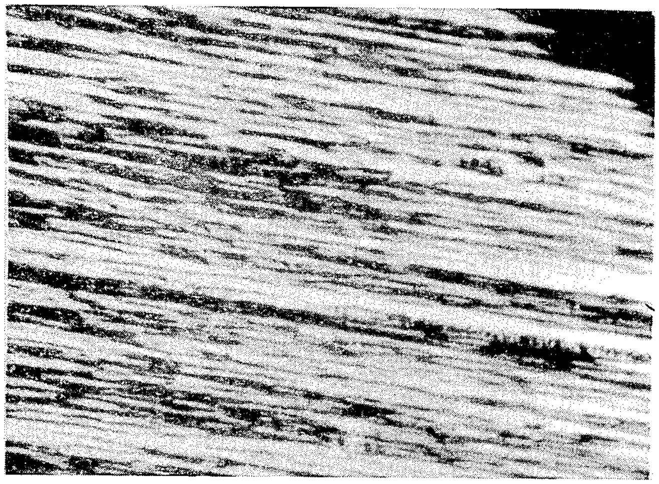
Figure 6:
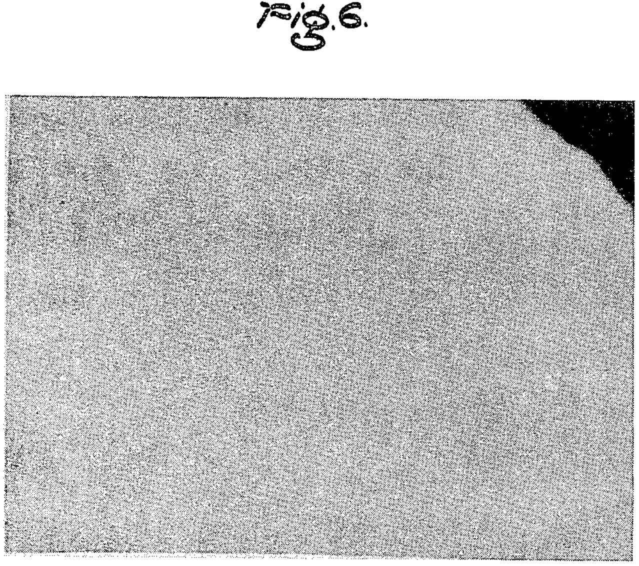

FIG. 5 is an actual photograph of the surface of stainless steel tape 1¼ mils thick having the highest degree of surface perfection commercially available as this surface appears when viewed by interference contrast microscopy at a magnification of 1107×; and FIG. 6 shows the same surface area of stainless steel tape with a thin polymerized layer of solventless varnish thereover as this coated surface appears when viewed by interference contrast microscopy at a magnification of 1107×.

Considering, first, the tape construction shown in FIG.

Figure 1:
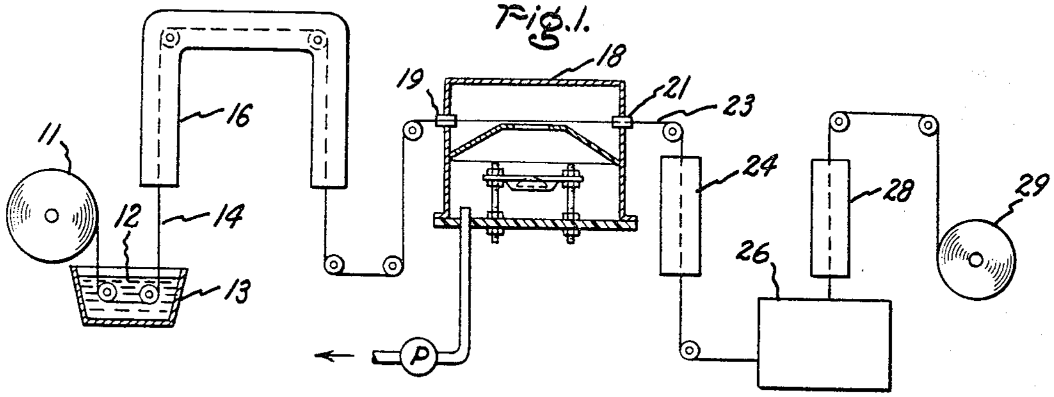
FIG. 1 is a schematic representation of the sequence of process steps productive of one embodiment of a reflective thermoplastic recording tape of high quality in accordance with this invention.

3 and the process for the production thereof shown schematically in FIG. 1, a roll 11 of stainless steel tape (35 millimeters wide and 1¼ mils thick) having the highest degree of surface perfection available with commercial surfacing methods is progressively drawn down into and then upwards out of a pool 12 of a solventless varnish, whereby as the tape 14 leaves bath 12, it is coated on both sides with this solventless varnish by the well-known meniscus tape coating technique. Solventless varnishes suitable for the practice of this invention are described in detail below.

Preferably before initiating the surface treatment thereof tape 14 should be cleaned. Any commercial detergent may be used for this purpose which leaves very little residue on the tape. An example of a suitable type of detergent is the type of detergent used for cleaning glass components prior to fabricating glassware equipment therefrom. Such a detergent must be capable of cleaning the surface of the glass leaving no residual film to interfere with the creation of a strong glass-to-glass bond.

Although tape 14 is described herein as being composed of steel, the invention is not so limited for the substrate can be metallic or non-metallic, such as a plastic or glass so long as the nature of the material is such as to permit a suitable bond with the solventless pre-polymer employed.

Tape 14 is passed upwardly, horizontally and then downwardly through heating chamber 16 at a relatively slow speed during which passage polymerization of the solventless varnish coating is completed to produce a heat resistant, solvent resistant, ultra-smooth solid surface 17 compatible with later-to-be applied coatings. The conditions of this heating step may vary depending upon the solventless varnish employed, for example the temperature may range from about 60 to about 180° C. and the time may extend from as long as 3 hours to as short as about 25 minutes. Ordinarily, the requisite thickness of the polymerized layer 17 will range from about 5 to about 12 microns in the case of a stainless steel surface of the quality of smoothness shown in FIG. 5. However, in the case of discrepancies of surface elevation in the tape 14 of a magnitude of greater than 1000 A., a polymerized layer thicker than 12 microns is required to fill in and smooth out the surface, while in the case of a surface having discrepancies therein of less than 300 A. a polymerized layer of less than 5 microns thickness may be employed with resultant satisfactory reduction in optical noise.

Although the polymerization to completion is herein described as being effected by "heating" it is to be understood that the energy input to the system required for this polymerization can be supplied by various mechanisms and processes known in the art.

Contrary to the behavior of solvent-containing coating materials; for example, varnishes and lacquers which quickly develop a hard skin covering during exposure to heat treatment thereby preventing the exercise of self-leveling of the surface of the material, solventless varnishes continue to self-level until this is prevented by the overall increase in viscosity of the material. The percentage of the total degree of shrinkage of the solventless varnishes which occurs after the capacity for self-leveling has disappeared is, therefore, very small.

The above-described surface smoothing and leveling has been performed by the novel expedient of employing solventless varnishes, which contain an appropriate catalyst to effect polymerization but do not contain any evaporable component (such as solvent) or do not generate any evaporable component during polymerization, and thereby are able to polymerize from a low viscosity, low volatile liquid state to a completely solid state with only a very small change in volume (not over 10%). Further, as noted above it is important that the solventless varnish be capable of self-leveling throughout any appreciable change in volume of this coating material thereby enabling it to remain in place and completely fill up small voids on the surface of stainless steel tape 14. Solvent-containing solutions shrink in proportion to the amount of solvent lost and much of the shrinkage occurs after the capacity for self-leveling has been lost, rendering these coatings ineffective for filling the voids to the extent required to minimize light scattering during optical read-out of the tape.

Having deposited and polymerized the surface-smoothing coating 17 on each side of metal tape 14, the coated tape proceeds through vacuum chamber 18 via entrance and exit seals 19 and 21, respectively, wherein a reflective layer 22 of aluminum is deposited by evaporation in the manner well-known in the art on one side of the coated tape 14 under a vacuum of about $5 \times 10^{-5}$ millimeters Hg or less to form a mirror surface having less than 2 percent light transmission. The thickness of the coating 22 is about a few hundred Angstroms thick and the total thickness of the mirror-coated tape 23 emerging from vacuum chamber 18 is about 1¾ mils.

After evaporation of the aluminum coating, tape 23 is passed through stabilizing chamber 24 where clean air or oxygen passes over the mirror coating stabilizing the aluminum layer as the tape is cooled. Although the process is described with the use of aluminum as the mirror coating other reflective metals such as chromium, silver or tin may be employed. A more complete description of the evaporation and stabilizing operations may be found in applicant's copending application Ser. No. 161,003 filed Dec. 21, 1961, now U.S. Patent No. 3,201,275.

After the stabilizing step, tape 23 passes through coating apparatus 26 wherein a layer 27 of thermoplastic composition is applied to one side of the tape 23 over mirror coating 22 by the well-known coating methods, such as by roll coating or meniscus coating. The thermoplastic layer may comprise a solution containing approximately 27 percent by weight, polydiphenylsiloxane, 3 percent polyphenyleneoxide, 50 percent benzene and 20 percent toluene. Other thermoplastic materials suitable for the production of reflective thermoplastic recording tapes are disclosed in U.S. Patent 3,063,872, Boldebuck.

After the thermoplastic layer 27 has been applied, the tape proceeds through a heating zone 28 wherein by gentle heating (about 5 to 15 minutes of heating at about 100–140° C.) any solvent introduced into the tape structure during the deposition of the thermoplastic layer 27 is gently removed by evaporation, thereby eliminating any irregularities in the surface of the aluminum mirror 22 which might otherwise be caused by swelling of the polymer underlay 17 for the mirror coating 22 due to the presence of absorbed solvent. The completed tape is then collected on roll 29.

Solventless varnishes may be prepared from mixtures of a polyhydrogen polysiloxane, an organic compound having a plurality of terminal aliphatic unsaturation sites, and an amount of suitable catalyst. After thorough blending, if the mixture is allowed to stand at room temperature for from about 8 to about 48 hours, a prepolymer is formed in which the viscosity of the solution increases due to the initial condensation and partial polymerization. When that viscosity has been achieved, which is best adapted to the particular method chosen for application of the pre-polymer solventless varnish to the substrate, it is ready for use in the operations described herein during which the polymerization is carried to completion in situ. Suitable catalysts may be prepared in the manner described in Chalk, U.S. patent application Ser. No. 207,045 filed July 2, 1962, now U.S. Patent No. 3,296,291 (organic rhodium compound) and in Lamoreaux, U.S. patent application Ser. No. 207,076 filed July 2, 1962, now U.S. Patent No. 3,220,972 (platinum-containing complex). However, any catalyst which is operative to catalyze the addition of silicon-hydrogen bonds across the terminal sites of aliphatic unsaturation can be employed By way of illustration, organopolysiloxane hydrides which may be used are, for example, 1,3-dimethyldisiloxane, 1,1,3-trimethyldisiloxane, 1,1,3,3-tetramethyldisiloxane, the cyclic trimer of methylhydrogensiloxane, the cyclic tetramer of methylhydrogensiloxane, the cyclic pentamer of methylhydrogensiloxane, etc. In conjunction with these organopolysiloxane hydrides, various unsaturated organopolysiloxanes, for example, vinylpentamethyldisiloxane, 1,3-divinyltetramethyldisiloxane, 1,1,3-trivinyltrimethyldisiloxane, 1,1,3,3-tetravinyldimethyldisiloxane, 1,3,5,7-tetramethyl - 1,3,5,7 - tetravinylcyclotetrasiloxane, 1,3,5,7 - tetraallyl-1,3,5,7-tetraphenylcyclotetrasiloxane, 1,3,5,7-tetravinyl-1,5-dimethyl-3,7-diphenylcyclotetrasiloxane, etc., may be employed to produce pre-polymer solventless varnishes by partial condensation in the presence of a suitable catalyst.

The amount of catalyst employed in preparing a solventless varnish material for the practice of this invention wherein the material is later to be converted to the finally polymerized state is a function of the particular catalyst employed, the temperature at which the pre-polymer is formed, the cocondensable ingredients used, and the degree of control offered over the rate of polymerization both at the temperature for pre-polymerization and also over the rate of final polymerization whether effected in the presence of heat or ultraviolet light and whether in the presence of, or the exclusion of, oxygen.

*Example 1*

A catalyst within the scope of the aforementioned copending application Ser. No. 207,076, now U.S. Patent No. 3,220,972 was prepared by dissolving one part by weight of chloroplatinic acid hexahydrate in ten parts of octyl alcohol and heating the solution at 70 to 75° C. at 25 millimeters for 16 hours during which time all water and hydrogen chloride was removed. The pressure was then reduced to 5 millimeters to remove all unreacted octyl alcohol. At the end of this time a product was obtained which was a dark, reddish-brown liquid soluble in alcohols, acetone, benzene, hexane, xylene, toluene and other common solvents. Chemical analysis of this mixture showed it to contain 3.5 atoms of chlorine per atom of platinum and 0.035 gram platinum per gram of the mixture.

An equimolar mixture of 1,3,5,7-tetramethyl-1,3,5,7-tetravinylcyclotetrasiloxane and 1,3,5,7-tetramethyl-1,3,-5,7-tetrahydrocyclotetrasiloxane was formed. A sufficient amount of the catalyst prepared above was added to provide $2.5\times10^{-6}$ gram atoms of platinum per mole of the vinyl-containing cyclotetrasiloxane. After thoroughly blending the ingredients, the resulting material was allowed to stand at room temperature (about 25° C.) for about 16–24 hours to produce a pre-polymer solventless varnish having a consistency suitable for application to stainless steel tape by the meniscus coating technique.

*Example 2*

An equimolar solution was prepared of 1,3,5,7-tetramethyl - 1,3,5,7 - tetraallylcyclotetrasiloxane and 1,5-diphenyl-3,7-dimethyl-1,3,5,7 - tetrahydrocyclotetrasiloxane. To this solution was added an isoamyl alcohol solution of chloroplatinic acid hexahydrate in sufficient amount to provide $1\times10^{-4}$ gram atoms of platinum per mole of the allyl-containing cyclotetrasiloxane. This solution was maintained at a temperature of about 25° C. until the increase in viscosity indicated formation of a suitable prepolymerized solventless varnish.

*Example 3*

A mixture was prepared in the ratio of one mole of 1,3,5,7-tetravinyl - 1,3,5,7 - tetramethylcyclotetrasiloxane as two moles of 1,5-dihydro-1,3,3,5,7,7-hexamethylcyclotetrasiloxane. To this mixture was added a sufficient amount of the catalyst prepared in Example 1 to provide $3\times10^{-6}$ gram atoms of platinum per mole of the 1,3,5,7-tetravinyl - 1,3,5,7 - tetramethylcyclotetrasiloxane. After thoroughly blending these ingredients, the resulting mixture was allowed to stand at room temperature for about 16–24 hours, during which time the viscosity of the mixture increased until a consistency of the pre-polymer solventless varnish suitable for application to the substrate was reached.

Another general designation of materials to be used in the practice of this invention are the unsaturated polyether esters. By the partial polymerization of unsaturated polyether esters, for example, triethyleneglycoldimethacrylate, diethyleneglycoldimethacrylate and ethyleneglycoldimethacrylate or mixtures thereof pre-polymers may be produced. Suitable catalysts for such partial polymerization are, for example, benzoyl peroxide, tertiary butyl hydroperoxide, dicumyl peroxide, etc. Some unsaturated polyether esters are available commercially as pre-polymers.

Still another group of materials which may be used in the preparation of pre-polymer solventless varnishes for use in the present invention are, for example, mixtures of: diethylene glycol maleate and styrene, diethylene glycol maleate and diallyl phthalate, triethylene glycol maleate and styrene, triethylene glycol maleate and diallyl phthalate, diethylene glycol fumarate and styrene, and diethylene glycol itaconate and diallyl phthalate. More complete information on various combinations of these and other polyesters are disclosed in U.S. Patents 2,443,735 to 2,443,741, inclusive, Kropa.

Mixtures of unsaturated polyether esters and unsaturated polyesters may also be used to prepare a suitable pre-polymer solventless varnish.

As indicated by above monomers of high molecular weight having low viscosity may be used as solventless varnishes by the addition of a suitable catalyst to enable polymerization in situ. Illustrative of such monomers are, for example, tetraethyleneglycoldimethacrylate, pentaethyleneglycoldimethacrylate, diethylene glycol maleate, triethylene glycol maleate, etc. Such materials may be used as monomers or may be allowed to stand after the addition of catalyst to permit some pre-polymerization prior to use.

In the production of the reflector structure of this invention excellent results were obtained with the pre-polymer prepared in accordance with Example 1 above because of the very low degree of shrinkage of this material during the completion of the polymerization in situ particularly after the coating has become very viscous. Actually, of the large number of pre-polymer solventless varnishes which may be prepared in accordance with the broad teachings of this invention, practical solventless varnish materials for the practice of this invention include only those solventless varnish materials meeting the following criteria:

(1) The material must be permissive of polymerization to completion in a relative low temperature range (60° C. to 180° C.);

(2) The viscosity of the material must either be in the range of between about 10 centipoise and about 20,000 centipoise at room temperature (to enable the application of a smooth, thin layer of material to the substrate) or be in the range of between about 10 centipoise and about 1,000 centipoise at between 60° C. and 180° C. (to insure self-leveling);

(3) The volatility of the material must be less than one millimeter of mercury at room temperature (23–27° C.);

(4) The degree of shrinkage exhibited by the material during the step of polymerization in situ must be less than about 10%, and (5) The material must be compatible with later-to-be applied coating materials or processes.

Figures 2, 3, 4:
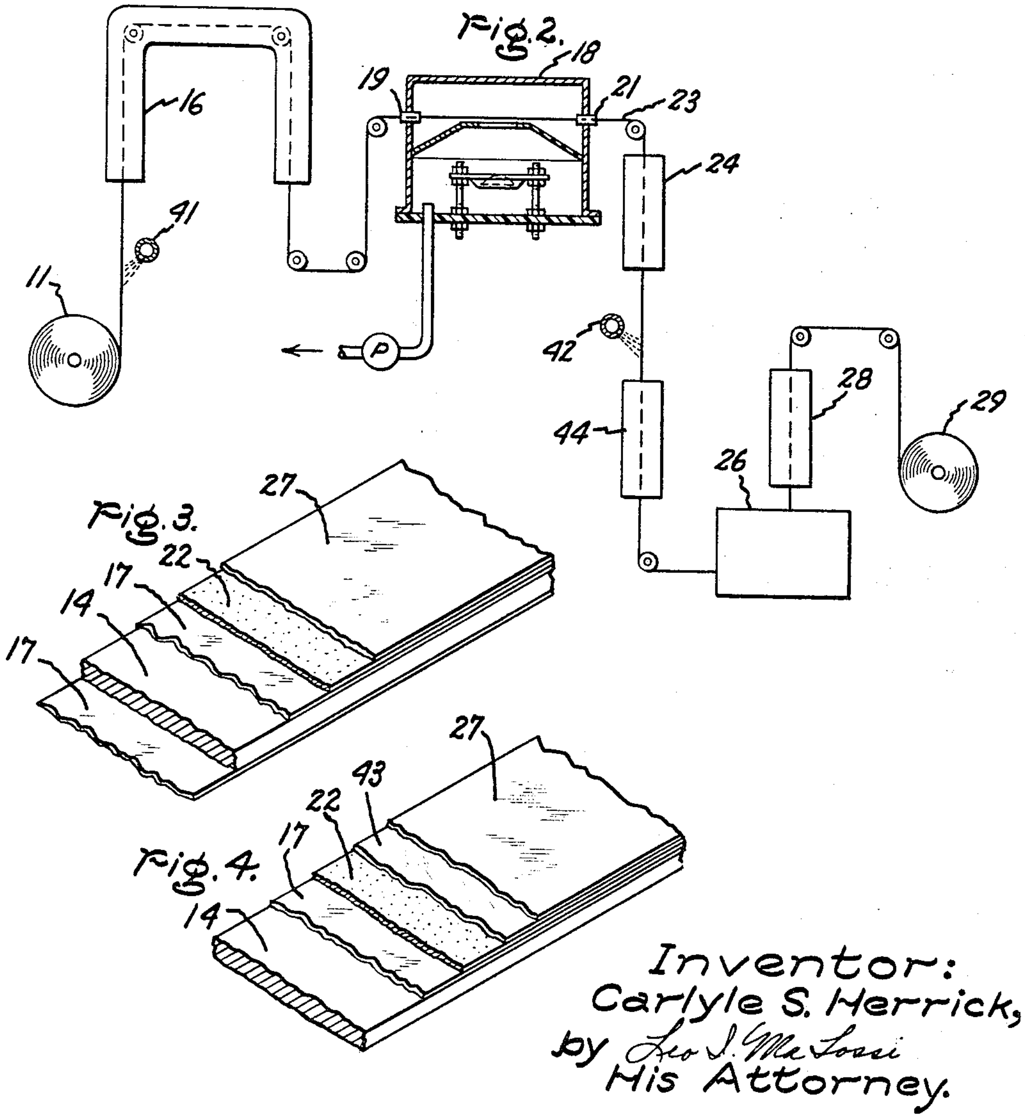
FIG. 2 is a schematic representation of an alternate series of process steps productive of a second embodiment of reflective thermoplastic recording tape in accordance with this invention.
FIG. 3 is a breakaway isometric view showing the layer-by-layer construction of reflective thermoplastic recording tape resulting from conduct of the process steps represented in FIG. 1.
FIG. 4 is a view similar to FIG. 3 showing tape construction produced in accordance with conduct of the process steps represented in FIG. 2.

In order to illustrate variations in the above-described process, reference is made to FIGS. 2 and 4 wherein in place of employing the meniscus coating apparatus of FIG. 1 to apply the layer of solventless varnish, this material is administered to one side of tape 14 by a spraying application from spray tube 41. The sprayed solventless varnish coating is then cured in heating zone 16 in the manner described above. Then the polymerized layer 17 is passed through vacuum chamber 18 wherein the mirror surface 22 is applied in the previously described manner. Following the exit of the mirror-coated tape 23 from vacuum chamber 18, this tape 23 is passed through the stabilizing operation in chamber 24 where the layer 22 is chemically stabilized as it cools thereby combining chemical and thermal stabilization.

Since layers of evaporated metal deposited in the abovementioned fashion are predominantly microporous, low surface tension liquids such as organic solvents may readily penetrate these thin layers of metal. For this reason, it has been found that when the mirror coated tape 23 is exposed to solvents such as benzene and/or toluene (as would occur in the coating apparatus 26 wherein the thermoplastic layer 27 is applied over reflective layer 22) a substantial amount of solvent passes through a microporous metal layer and is entrapped thereunder in numerous miscroscopic-size solvent-swollen areas within the surface-smoothing polymerized layer 17 beneath aluminum mirror 2. Such behavior has been found to be the case even with solventless varnishes previously considered to be unaffetced by solvents. It has been found that these swollen areas if allowed to remain will greatly increase the optical noise of the tape and thereby produce an inferior product. This problem may be solved either in the manner described in connection with the process in FIG. 1; namely, by employing a period of gentle heating in the heating zone 28 or, as in the method employed in the process of FIG. 2, by the application over the mirror surface 22 of a solvent-resistive polymer to seal the surface 22 preventing the access of solvent to the surface-smoothing polymer layer 17.

Thus, in FIG. 2 after the passage of tape 23 through the stabilizing zone 24, a coating is applied to the mirror side of tape 23, this coating being a chromated polyvinyl alcohol polymer about 0.2 micron thick. The polyvinyl alcohol may be applied by roll coating, meniscus coating or, as shown with spray coating apparatus 42 from a solution containing 25 grams polyvinyl alcohol (polyvinyl acetate hydrolyzed 86 and 89 percent having a viscosity of 19 to 25 centipoises at 20° C. in a 4 percent water solution), 11 grams ammonium dichromate, 1000 cc. ethyl alcohol denatured and 600 cc. distilled water to produce the coating 43. After drying for 10 minutes at 110° C. in heater 44, coating 43 forms an optically clear solvent resistive barrier between the porous metallic layer 22 and the subsequently applied thermoplastic layer 27 deposited in the manner described above, thereby preventing absorption by the surface smoothing polymer coating 17 of benzene and/or toluene from the coating solution from which deposition of the thermoplastic is obtained.

Examples of other solvent resistant polymers that may be employed in place of the polyvinyl alcohol are (1) phenol-formaldehyde novolac resin (identified as Base Coat No. 107 resin manufactured by Schwartz Chemical Company, Inc., 327 W. 20th St., N. Y.) dissolved to a solids content of about 27 percent in butyl cellulose (or monobutyl ether of ethylene glycol) and (2) a polyvinyl alcohol employing a different cross-linking agent. A solution of the latter would consist of 25 grams of the previously described polyvinyl alcohol, 600 cc. deionized water, 200 cc. denatured ethyl alcohol, 2½ grams dimethylolurea and ¼ gram ammonium chloride.

In either of the above-described processes the overall thickness of the completed tape is about 2 mils, the coating of the polyvinyl alcohol being from about 0.2 micron to 0.5 micron thick and the thermoplastic layer being from about 5 to 10 microns thick.

The quality of reflective thermoplastic recording tape is determined primarily by two factors, the "writeability" of the thermoplastic polymer and the number and intensity of the optical blemishes in the tape. Optical readout from reflective tape is accomplished by observing a beam of light that has been reflected from the tape. As the incident light strikes the reflective tape most of the light is specularly reflected, that is with the angle of incidence being equal to the angle of reflection. However, that portion of the incident light which strikes the optical blemishes is scattered since the angle of incidence and the angle of reflection of these rays is not equal. These scatterings of light, because of the nature of the optical system employed in the read-out of TPR tape, when present to any substantial degree, are focused in the final image and noted by the viewer's eye detracting from concentration on and reception of the intelligence being transmitted from the tape. It is, therefore, very important to the successful commercial use of this product that the light scattering centers be greatly reduced in number and for those optical blemishes remaining on the tape, preferably to be reduced in size sufficiently so that light scattered therefrom will be subdued in intensity such as not to be distracting to the viewer.

The marked difference in the reduction in light scattering provided by the use of a thin coating of solventless pre-polymer in comparison with other possible modes of surface treatment is shown quantitatively by observation of the surface in a dark field optical system as in the following examples:

EXAMPLE 4

Stainless steel tape 35 mm. wide and 1 mil thick having the highest degree of surface smoothness commercially available was examined in dark field illumination under a microscope. The field of view was photographed at 35× magnification using Polaroid 3000 speed, type 47 picture roll exposed for 90 seconds and the number of light scattering sites visible in the photographs were counted. The count for the stainless steel tape without any coating applied thereto was 800 light scattering sites per square millimeter.

EXAMPLE 5

Stainless steel tape as in Example 4 was coated with lacquer (Clear Gloss Rubbing Lacquer No. A4451 made by Tremco Mfg. Co., Jamestown, N.Y. thinned with ethyl acetate to 24 percent solids) in a layer having a dry thickness of 5.7 microns. After three days of drying at room temperature the sample was placed in a vacuum chamber similar to vacuum chamber 18 where a thin layer of aluminum was deposited over the lacquer surface at a chamber pressure of about $1 \times 10^{6}$ mm. Hg until the light transmission of the aluminum layer (about 500 angstroms thick) was about 2 percent. The purpose of aluminizing the lacquer surface is in order to assure that, when illuminated and viewed in the dark field optical system, the true contour of the lacquer surface is seen and photographed by preventing any reflection from the substrate surface to show through the thin lacquer layer. The aluminized lacquer surface appeared highly reflecting and smooth to the unaided eye and was free of milky discoloration as would be caused by the formation of aluminum oxide. However, when the aluminized lacquer surface was examined and photographed under dark field illumination through a microscope using the same magnification, film, illumination intensity and exposure time as in Example 4, the number of visible light scattering sites was counted and found to be 194 per square millimeter.

*Example 6*

Stainless steel tape of the kind employed in Example 4 was coated with varnish (Super Valspar Clear Gloss Varnish made by Valspar Corp., Ardmore, Pa. thinned with benzene to 39.1 percent solids) in a layer having a thickness when dry of 5.3 microns. After three days of drying at room temperature the sample was aluminized as described in Example 5 and the aluminized varnish surface was examined in dark field under a microscope. The field of view was photographed using the same magnification, film illumination intensity and exposure time as in Example 4 and the number of visible light scattering sites was counted and found to be 33 per square millimeter.

*Example 7*

Once more stainless steel tape of the kind used in Example 4 was coated with a low viscosity, solventless pre-polymer of low volatility (mixed tetramer silicone pre-polymer as prepared in Example 1) in a layer having a dry thickness of 5 microns. Polymerization was completed by heating for 3 hours at 100° C. The tetramer silicone surface was aluminized as described in Example 5 and then examined in dark field illumination under a microscope. When the field of view was photographed using the same magnification, film, illumination intensity and exposure time as in Example 4, it was determined that in the case of the mixed tetramer silicone coating the count of light scattering sites was one per two square millimeters.

*Example 8*

Because of the fact that use of the mixed tetramer silicone film reduced the incidence of light scattering sites so markedly it was felt that another sample should be prepared and in order to determine a range of variation that could be expected in the number of light scattering sites encountered in the practice of this invention. Therefore, the construction of Example 7 was repeated except that the magnification used was 17× magnification. The count of the number of visible light scattering sites was one per 12 square millimeters.

The results are sumarized below in Table I:

TABLE I

| Example | Material | Counts per 70 mm.$^2$ (one 16 mm. frame) |
|---|---|---|
| 4 | Stainless steel surface untreated | 56,000 |
| 5 | Aluminized lacquer surface | 13,600 |
| 6 | Aluminized varnish surface | 2,310 |
| 7 | Aluminized tetramer silicone surface | 35 |
| 8 | do | 6 |

From Table I it is, therefore, apparent that the surface produced with the solventless varnish contained fewer light scattering blemishes than even the varnish coated surface by a factor of from 66 to 385 and the improvement effected over the lacquered surface is even greater.

Although in the case of reflective tape an average of no more than 2 counts per square millimeter can be tolerated in a commercial TPR tape construction, some latitude can be allowed in the case of assemblies wherein energy needs to be concentrated or distributed in general; such as in reflectors for optical assemblies or for outdoor lighting applications. Therein a count of about 7 counts per square millimeter may be tolerated. It is to be understood that the light scattering sites are not gross surface mars or distortions visible to the naked eye such as are correctable by the application of commercial polishing or surfacing procedures, but rather are minute imperfections approximately 1 micron or less across.

Compared to the number of counts per 70 mm.$^2$ listed in Table I, the level of tolerance for TPR tape construction and for reflecting assemblies in general would be 140 counts and 490 counts, respectively.

As further indication of the marked improvement effected by this invention actual photographs have been reproduced to show the stainless steel tape surface at 1107× magnification (FIG. 5) and the same surface area with the polymerized layer of pre-polymer solventless varnish applied thereto viewed at the same magnification (FIG. 6). Even more pronounced than the view of the tape with the unaided eye or high powered microscope is the fact that none of the coatings described and tested above (Examples 4, 5 and 6) can provide the degree of freedom from surface blemishes required to be within a commercially practical limit for optical noise as is needed in the manufacture of reflective thermoplastic recording tape.

What I claim as new and desire to secure by Letters Patent of the United States is:

1. Reflector construction having a high degree of specularity and a low degree of image distortion comprising in combination:

(a) a substrate, having irregularities and imperfections in a surface area thereof, said irregularities and imperfections measuring less than about 1 micron across (b) a coating of polymerized solventless varnish in direct contact with and extending over said surface area of said substrate filling sustantially all said irregularities and imperfections to a common level, (1) whereby said irregularities and imperfections on said surface area are filled and hidden, and (c) a reflective layer in direct contact with and extending over said polymerized coating.

2. Reflector construction as recited in claim 1 wherein the coating of polymerized solevntless varnish consists of a polymerized mixture of a polyhydrogen polysiloxane and an organic compound having a plurality of terminal aliphatic unsaturation sites, said coating presenting a surface having an average count of minute surface imperfections therein as determined by the use of a dark field optical system of less than 8 counts per square millimeter.

3. Reflector construction as recited in claim 1 wherein the coating of polymerized solventless varnish consists of polymerized unsaturated polyester, said coating providing a surface having an average count as determined by the use of a dark field optical system of less than 8 minute imperfections per square millimeter.

4. Reflector construction as recited in claim 1 wherein the coating of polymerized solventless varnish consists of polymerized unsaturated polyether ester, said coating providing a surface having an average count as determined by the use of a dark field optical system of less than 8 minute imperfections per square millimeter.

5. A thin flexible mirror construction of high quality and long life for the production of reflective thermoplastic recording tape comprising in combination:

(a) a flexible substrate tape having at least one surface thereof of commercial smoothness, (b) a surface-smoothing layer from about 1 to about 20 microns in thickness in direct contact with and covering said one surface and filling substantially all surface depressions on said one surface to a common level, (1) said layer consisting of polymerized solventless varnish, and (c) a highly reflective metallic coating in direct contact with and extending over said surface-smoothing layer, said coating having a thickness ranging from about 300 to about 1000 angstroms.

6. A thin flexible mirror construction substantially as recited in claim 5 wherein the flexible substrate is a metal tape and the surface-smoothing layer consists of a polymerized mixture of a polyhydrogen polysiloxane and an organic compound having a plurality of sites of terminal aliphatic unsaturation.

7. A thin flexible mirror construction as recited in claim 6 wherein the metal tape is stainless steel and the surface-smoothing layer provides a surface having an average count as determined by the use of a dark field optical system of no more than 2 minute imperfections per square millimeter.

8. A thin flexible mirror construction substantially as recited in claim 5 wherein the flexible substrate is a metal tape and the surface-smoothing layer consists of polymerized unsaturated polyester.

9. A thin flexible mirror construction substantially as recited in claim 5 wherein the flexible substrate is a metal tape and the surface-smoothing layer consists of polymerized unsaturated polyether ester.

10. Reflector construction having a high degree of specularity and a low degree of image distortion comprising in combination:

(a) a substrate, having imperfections measuring less than about 1 micron across in a surface area thereof (b) a coating of from about 1 to about 20 microns in thickness of polymerized solventless varnish in direct contact with and extending over said surface area of said substrate filling substantially all surface depressions on said surface area to a common level, (1) said coating providing an outer surface having an average count as determined by the use of a dark field optical system of not more than about 7 minute imperfections per square millimeter, and (c) a reflective layer over said polymer coating in a thickness of from about 300 to about 1000 Angstroms.

11. The reflector construction recited in claim 10 wherein the polymerized coating consists of a polymerized mixture of 1,3,5,7-tetramethyl-1,3,5,7-tetrahydrocyclotetrasiloxane and 1,3,5,7-tetramethyl-1,3,5,7-tetravinylcyclotetrasiloxane and the reflective layer is of aluminum.

12. A thin flexible mirror construction of high quality and long life for the production of reflective thermoplastic recording tape comprising in combination:

(a) a flexible substrate tape having at least one surface thereof of commercial smoothness, (b) a surface-smoothing layer from about 1 to about 20 microns in thickness contiguous with and covering said one surface filling substantially all surface depressions on said one surface to a common level, (1) said layer being a layer of polymerized solventless varnish, (c) a highly reflective metallic coating contiguous with and extending over said surface-smoothing layer, said metallic coating having a thickness ranging from about 300 to about 1000 Angstroms, and (d) a layer of solvent resistant polymer covering and sealing said metallic coating.

13. A thin flexible mirror construction as recited in claim 12 wherein the flexible substrate is a metal tape about 1¼ mils thick and the surface-smoothing layer consists of a polymerized mixture of 1,3,5,7-tetramethyl-1,3,5,7-tetrahydrocyclotetrasiloxane and 1,3,5,7-tetramethyl-1,3,5,7-tetravinylcyclotetrasiloxane.

14. A thin flexible mirror construction as recited in claim 13 wherein the layer of solvent resistant polymer consists of a layer of chromated polyvinyl alcohol polymer about 0.2 micron thick and the surface-smoothing layer provides an outer surface having an average count as determined by the use of a dark field optical system of not more than 2 minute imperfections per square millimeter.

15. A reflective thermoplastic recording tape construction comprising in combination:

(a) a flexible tape substrate, (b) a surface-smoothing layer from about 1 to about 20 microns in thickness contiguous with and covering at least one surface of said tape, (1) said layer consisting of a polymerized solventless varnish, (c) a highly reflective metallic coating over said surface-smoothing layer, and (d) a layer of thermoplastic composition deposited over said metallic coating to produce an overall thickness for the completed tape of less than about 2 mils.

16. A reflective thermoplastic recording tape construction as recited in claim 15 wherein the polymerized layer has an outer surface having an average count as determined by the use of a dark field optical system of not more than 2 minute imperfections per square millimeter.

17. A method for the production of a reflective thermoplastic recording tape having on the average not more than about 2 light scattering imperfections per square millimeter of the specular surface thereof comprising the steps of:

(a) depositing a thin film of solventless varnish directly over the surface of a thin, flexible substrate, (b) polymerizing the film of solventless varnish, (c) depositing a reflective layer directly on the surface of the polymerized film, (d) applying a thin layer of thermoplastic polymer containing a solvent selected from the group consisting of benzene and toluene directly over the reflective layer and (e) heating the laminated structure at a temperature of less than about 140° C. for at least about 5 minutes.

18. The method recited in claim 17 wherein polymerization is effected by heating in the range of from about 60 to about 180° C., and the reflective layer is deposited by evaporation coating.

References Cited

UNITED STATES PATENTS

| | | | |
|---|---|---|---|
| 2,375,669 | 5/1945 | McKinney | 117—71 X |
| 2,405,662 | 8/1946 | McManus et al. | 204—192 |
| 2,688,569 | 9/1954 | Malone et al. | 117—75 |
| 2,721,873 | 10/1955 | MacKenzie et al. | 106—287 |
| 3,053,785 | 9/1962 | Rosenbloom | 117—75 |

DAVID SCHONBERG, *Primary Examiner.*

P. R. MILLER, *Assistant Examiner.*